United States Patent
Carlson et al.

(10) Patent No.: US 10,567,351 B1
(45) Date of Patent: Feb. 18, 2020

(54) POLYMORPHIC ONE TIME PAD MATRIX

(71) Applicant: Cipherloc Corporation, Buda, TX (US)

(72) Inventors: Albert Henry Carlson, Buda, TX (US); Robert LeBlanc, Buda, TX (US); Robert Carlson, Buda, TX (US); Patrick Doherty, Buda, TX (US); Carlos Gonzales, Buda, TX (US)

(73) Assignee: Cipherloc Corporation, Buda, TX (US)

(*) Notice: Subject to any disclaimer, the term of this patent is extended or adjusted under 35 U.S.C. 154(b) by 0 days.

(21) Appl. No.: 16/033,450

(22) Filed: Jul. 12, 2018

Related U.S. Application Data

(62) Division of application No. 15/265,380, filed on Sep. 14, 2016, now Pat. No. 10,069,805.

(51) Int. Cl.
| | |
|---|---|
| *H04L 29/06* | (2006.01) |
| *H03K 19/1776* | (2020.01) |
| *H04L 9/06* | (2006.01) |
| *G06F 7/58* | (2006.01) |
| *H04L 9/12* | (2006.01) |

(52) U.S. Cl.
CPC .......... *H04L 63/0428* (2013.01); *G06F 7/582* (2013.01); *H03K 19/1776* (2013.01); *H04L 9/0625* (2013.01); *H04L 9/0662* (2013.01); *H04L 9/12* (2013.01); *H04L 63/062* (2013.01)

(58) Field of Classification Search
CPC ..... H04L 63/0428; H04L 9/0625; H04L 9/12; H04L 9/0662; H04L 63/062; G06F 7/582
See application file for complete search history.

(56) References Cited

U.S. PATENT DOCUMENTS

| | | | | |
|---|---|---|---|---|
| 2006/0233374 A1* | 10/2006 | Adams | ................ | G06Q 20/341 380/268 |
| 2006/0251249 A1* | 11/2006 | Orr | ........................ | G06F 7/588 380/46 |
| 2009/0201936 A1* | 8/2009 | Dumet | .................. | H04J 3/0641 370/401 |

* cited by examiner

*Primary Examiner* — Chau Le
(74) *Attorney, Agent, or Firm* — Richard L. Moseley

(57) ABSTRACT

The present invention provides a simple and efficient cipher and key generation and selection capability from a predetermined, randomly changing, fixed size matrix (N) of ciphers and keys resulting in a very high-order approximation ($N_{r,c \to \infty}$) of a true One Time Pad for encryption solutions such as the CipherLoc Polymorphic Key Progression Algorithmic Cipher Engine. The ciphers are randomly selected from a pool of user supplied ciphers, FIPS 140-2 or other certified ciphers and the keys are produced from various methods for generating a key that includes reading a data stream from a network or a Cryptographic Pseudo Random Number Generator (CPRNG)/Pseudo Random Number Generator (PRNG) or a Predetermined Cryptographic Key Generator (PCKG) or any combination of all. Ciphers and generated keys are randomly paired and stored in a volatile matrix for use by an encryption solution. When used with the CipherLoc Polymorphic Key Progression Algorithmic (PKPA) Cipher Engine, the OTP Matrix is a method of accomplishing the generation of the key and the selection and association of a suitable cipher with that key, for each sub-message, such that not only key space and equivalent keys (isomorphs) become important, but, the number of keys are also important, thus increasing the effective size of the key space in each sub-message.

5 Claims, 12 Drawing Sheets

One Time Pad Matrix

POLYMORPHIC ONE TIME PAD MATRIX

BACKGROUND OF THE INVENTION

This application is a Divisional Application of Ser. No. 15/265,380 filed on Sep. 14, 2016.

Today's modern lifestyle depends on digital computer systems and those systems are vulnerable to attacks that disrupt communications, alter/access data, or issue false commands/data. Disrupting communications hampers the ability of the system to react to changing conditions. If that reaction is delayed too long, the asset or facility may not be able to alter its' operation in time to prevent a service outage or damage to the equipment. Altering and accessing data allows the system to react correctly but changes the situation perceived by the controlling computer to be one which does not exist or simply supplies the intruder with sensitive information. Finally, issuing false commands tells the system to alter its state to react the wrong way, potentially resulting in damage to the system or, loss of service or loss of life. For example, one type of attack that issues false commands is the "replay" attack in which a hacker records commands sent by the network and then replays it on the network. This attack is very effective because the hacker does not have to decrypt the message; he merely observes the effect of the traffic. Replay attacks can be used over and over until the system rejects those messages.

All of these kinds of attacks can be foiled using a single defensive countermeasure—polymorphism.

Polymorphism, or "mutating", is the ability to change (perhaps an encryption to another method of encryption or key or maybe even hardware functionality) on the fly. Polymorphic ciphers are a revolutionary idea based on the information content in a message rather than the difficulty of the key. Using advanced set theory and information theory, this encryption method does not rely exclusively on keys (K) that are large and complicated permutation/obscuring techniques. This makes the algorithm faster and requires less memory than other encryptions. The important thing is to make sure that the cipher (C) changes very quickly, at least as fast as the effective "Unicity Distance", herein after defined as $$N = \frac{\text{Log}|K|}{R_\lambda \text{Log}|A|} \text{ and } N_{\text{Eff}} = C \cdot N, \text{ or,}$$

and $N_{\text{Eff}} = C \cdot N$, or, that certain amount of information needed in order to decrypt an encrypted message. In his paper "Using Set Theoretic Estimation to Implement Shannon Secrecy Theory", Dr. Carlson teaches us that polymorphic changes take place at a rate no slower than the effective "unicity distance" of the cipher and more frequently than enough information can be collected to break the code. Before the critical amount of data can be collected the cipher and key have changed, requiring the hacker to solve an entirely new problem as shown in FIG. 8:

Even if one section of the cipher is broken, the next section of the message must be broken with the same amount of effort, but no data carries over into the new problem to help the hacker. Most other ciphers are broken more easily as hardware gets faster because it is easier to check all possible keys in the cipher key space. However, if a polymorphic cipher is implemented properly, the speed of the encryption will increase as the hardware gets faster. Thus, unlike other ciphers, this type of software becomes safer as computers get faster.

A polymorphic cipher solves asset intrusion and electronic attack problems in the following ways:

(1) Incorrectly encrypted data is rejected as noise on the network. Rejecting the data quickly reduces the hacker's ability to create a denial of service (DOS) condition. Rejected packets mark the sending node as bad and all future communications are rejected without processing, reducing the load on the receiving processor. Lack of communications is also detected if regular requests for synch are transmitted.

(2) Data messages cannot be faked because the encryption or key changes too quickly. Data with the wrong encryption is rejected, limiting or eliminating the reception of bad data. Equipment works correctly because only the correct data is received and processed.

(3) Issuing bogus commands (e.g. "replay" attacks) is also prevented by polymorphic encryption. Any incorrectly encrypted commands will be rejected and are never presented to the equipment. Replay attacks are similarly thwarted since they are rejected as incorrectly encrypted at a later time when the key is invalid.

(4) Unauthorized data access is thwarted by changing the encryption too fast for spoofing and by rejecting incorrectly encrypted requests for service. In addition to rejecting bad requests the number of possible cipher/key combinations makes guessing the currently active key and cipher is nearly impossible. Even if the correct combination is found it is necessary to break all key/cipher pairs to reveal the entire message. Only a small portion of the data is compromised and it will not contain enough data to be useful to a hacker.

In his patent, U.S. Pat. No. 1,310,719, issued in 1913, included herein by reference, Gilbert Vernam described what has later become known as the One Time Pad (OTP). In 1949, Claude Shannon's (Shannon) famous World War II research was published as "A Mathematical Theory of Communication" included by reference herein, in which he proved that any unbreakable system of encryption must have the same characteristics as the OTP: the key must be truly random, as large as the plaintext, never reused in whole or in part and it must be kept secret. However, traditional OTP keys must be:

1. Distributed by hand because they cannot be recreated deterministically by the consuming node;
2. Generated from a totally random source.

Note: Shannon teaches that for short sequences, it is not possible to recover the function that generates the sequence. Carlson, et.al., called this the "Local Unicity Distance" ($N_{local}$) and showed it is related only to the characters in the submessage. Therefore, if $$N_{Local} < |n_{c,\text{eff}}| \cdot |\text{submessage}|$$

the need for true randomness is overcome for that submessage.

Cipher keys and cipher selection are essential parts of a polymorphic cipher solution. CipherLoc® allows a user to include any FIPS certified 140-2 cipher, or any other certified cipher, as part of the "CipherLoc® pool" of working ciphers which CipherLoc® then uses in a random fashion to encrypt messages. CipherLoc® also must have a source of non-isomorphic (unique) keys to use with the CipherLoc® pool of working ciphers. This means that each key must be unique and capable of being distributed in a manner such that the resulting combination of unique key(s) and encryption ciphers has the same effect as though they were each a One Time Pad (OTP) without the disadvantages of a OTP such as financial drawbacks and resource requirements normally allowing only governments to actually use it. In addition, traditional OTP keys must be distributed by hand and generated from a totally random source and the present invention, hereinafter the CipherLoc® Polymorphic One Time Pad Matrix (OTP Matrix) overcomes this need. The OTP Matrix facilitates the speed of the encryption by simplifying and radically speeding up the key/cipher selection process and as computer hardware gets faster, the complexity, security and performance of the OTP Matrix will be able to be increased.

The OTP Matrix is designed to function best as a hardware solution implemented on a Field Programmable Gate Array chip, but, can also be implemented as a firmware solution or software solution (in a dual-ported memory with supporting hardware chips environment).

SUMMARY OF THE INVENTION

The OTP Matrix provides a simple and efficient cipher and key generation and selection capability from a predetermined, randomly changing, fixed size matrix (N) of ciphers and keys resulting in a very high-order approximation ($N_{r,c \to \infty}$) of a true One Time Pad for encryption solutions such as the CipherLoc Polymorphic Key Progression Algorithmic Cipher Engine. The ciphers are randomly selected from a pool of user supplied ciphers, FIPS 140-2 or other certified ciphers, and the keys are produced from various methods for generating a key that includes reading a data stream from a network or a Cryptographic Pseudo Random Number Generator (CPRNG)/Pseudo Random Number Generator (PRNG) or a Predetermined Cryptographic Key Generator (PCKG) or any combination of all. Ciphers and generated keys are randomly paired and stored in a volatile matrix for use by an encryption solution. When used with the CipherLoc Polymorphic Key Progression Algorithmic (PKPA) Cipher Engine, the OTP Matrix is a method of accomplishing the generation of the key and the selection and association of a suitable cipher with that key, for each sub-message, such that not only key space and equivalent keys (isomorphs) become important, but, the number of keys are also important, thus increasing the effective size of the key space in each sub-message. The OTP Matrix can be used independently of the CipherLoc PKPA Cipher Engine by other encryption solutions and can be implemented as a hardware solution, a firmware solution or a software solution.

DETAILED DESCRIPTION

CipherLoc® Polymorphic One Time Pad Matrix

Cryptography and cryptanalysis are processes for obscuring and revealing the information contained in a message. Recovering the message without knowing the original key is the objective of the cryptanalyst—and hackers.

CipherLoc® is the first truly Polymorphic Cipher Engine that can be used in commercial, security sensitive applications. Part of its encryption process slices each complete message into sub-messages and does not use just one cipher or one key. Part of that process requires that it randomly selects a cipher and key and uses them for each sub-message and continues in this manner until the entire message is encrypted. Key generation and cipher selection can be slow processes, if done sequentially.

In CipherLoc®, keys and key generation rely, in part, on what Whilhite teaches in US PG PUB No. 2005/0074118, herein incorporated by reference, which reads a data source, in that instance it is a network data stream, selects a portion of data from the data stream and assembles the selected portions to form the basis of the key. The result is the CipherLoc Polymorphic One Time Pad Matrix.

Figures 8, 9:
FIG. 8 is an illustration the problem facing a hacker.
FIG. 9 is an illustration of a one time pad matrix.

The OTP Matrix, FIG. 9, functions as a Look Up Table (LUT) and is a method of accomplishing the generation of the key and the selection and association of a suitable cipher with that key, for each sub-message, such that not only key space and equivalent keys (isomorphs) in CipherLoc® become important, but, the number of keys are also important, thus increasing the effective size of the key space in each sub-message.

1. Consists of reconfigurable blocks that implement a key for a particular cipher. For example, the cipher 3DES might be Cipher 1($C_1$) with Key 1($K_1$) whose value might be "1234567uqasow", located in row 1, column 1, shown as $C_1K_1$ in Table 2. Whereas $C_9K_{12}$ might be the cipher AES with key "94fkeike04857mejfkfvk9" and $C_3K_2$ might be cipher DES with key "362438-53-120:ummvjddooweierurnvn mcjdkldllf".

2. Each of the blocks in the matrix is independent of the other and each block has and independent Time To Live (TTL) which is maintained in a table corresponding to each block in the matrix. When the TTL expires: (Note: Random refers to selection via the keys, described earlier.)

a. The cell is marked as expired
b. The cell is reset with a new, randomly selected cipher (c), key (k) and TTL
c. Start TTL clock where one is subtracted from the TTL of each cipher in the table for every transmitted block
d. The "expired" marker is removed from the cell
3. Each symbol, or block, uses a random row/column to select what block the encryption process will use. (Note: If a block is being replaced or is marked as expired when selection occurs, the block is marked and if marked, the next block is selected as with a hash collision.)
4. Because selection is random, as with and IRV (Independent Random Variable), the probability of selecting the same block sequentially is the same as selecting any other block or $$Pr(r_i c_j) = 1/|r||c|$$

Note: $|R|$ in information theoretics means the size of R and not the absolute value of R. The same is true for $|5|$.

For M identical sequential blocks, such as $(r_1 c_1)$, $(r_1 c_2)$, $(r_1 c_3)$ . . . selected sequentially $$Pr_m(r_i c_j) = (1/|r||c|)^m$$

Therefore, the average number of times an encryptor is selected is bounded by $$|blk| = 1 + 2/(|r||c|)$$

5. The time needed to select a block is far smaller than the time required to reconfigure a block. But the time to replace a block is far smaller than doing $|r||c|$ character encryptions.
6. Certain types of support chips called Field Programmable Gate Arrays (FPGAs) have the ability to be reconfigured while operating as opposed to their closest counterpart, the static, Application Specific Integrated Circuit, or ASIC, chip. This means that a chip and a circuit can be altered during operation such that if the OTP Matrix were implemented on an FPGA chip, the OTP Matrix could be updated continuously while the chip is working. With more than 1 processor on an FPGA, critical functions like TTL are supported, including row and column setup, r,c initialization and LUT setup in the OTP Matrix. Alternatively, the OTP Matrix can be implemented in firmware as a memory management application or in software with operating system restrictions. The same function can also be provided with a correctly configured dual-port memory and supporting chips.

This becomes important because local entropy and local unicity distance applied to the submessage allows the cryptanalyst or hacker to decide what can be decrypted and how much information is needed for the decryption.

Most ciphers overstate the number of unique keys in the key space, but, with the CipherLoc® OTP Matrix, CipherLoc® does not because it has no isomorphs. Thus, all keys, for all intents and purposes, are equally secure because the effective key space (the key space composed of the truly unique keys for a message) of the key is not known to any attacker and as a result, would increase the number of brute force choices any attacker would need to make which increases the impossibility of ever breaking a CipherLoc® encrypted item.

As with other functions of CipherLoc®, the OTP Matrix changes "on the fly" which makes it possible to implement polymorphic key progressions resulting in being able to significantly multiply the number of keys and ciphers used in the encryption process. This means, unlike almost all other solutions, there is no need to go off-line in order to make any required adjustments.

Introduction

Embodiments of the Present Invention Involve Various Methods of generating keys, including sampling and processing a network data stream at each end of a communication path and storing those keys along with predetermined encryption algorithms in a matrix and making those keys and algorithms available for use by an encryption engine, such as the CipherLoc Polymorphic Key Progression Algorithmic Cipher Engine, for obscuring.

Terms

Network or Computer Network—refers to a group of computer systems and other computing hardware devices that are linked together through electronic communication channels to facilitate communications with each other and to share resources among a wide range of users. Networks are commonly categorized based on their characteristics.

Data Stream and Network Communication—refers to all electronic communication between a network of two or more devices.

Node—refers to a basic unit used in computer science and are devices or data points on a larger network used either as a connection point, a redistribution point, or a communication endpoint. Devices such as a personal computer, cell phone, printers and data terminal equipment are nodes.

Module—in computer terms, refers to a selection of independent electronic circuits packaged onto a circuit board to provide a basic function within a computer. An example might be an inverter or flip-flop, which would require two or more transistors and a small number of additional supporting devices.

Generator—in computer science, a generator is a special routine that can be used to control the iteration behavior of a loop and can be hardware, firmware or software based. In fact, all generators are iterators.

Electronic Communications—means any transfer of signs, signals, writing, images, sounds, data, or intelligence of any nature transmitted in whole or in part by a wire, radio, electromagnetic, photo-electronic or photo-optical system.

Pseudo Random Number Generation (PRNG)—is an algorithm for generating a sequence of numbers whose properties approximate the properties of sequences of random numbers. The PRNG-generated sequence is not truly random, because it is completely determined by a relatively small set of initial values, called the PRNG's seed (which may include truly random values). Pseudorandom number generators are important in practice for their speed in number generation and their reproducibility.

Cryptographic Pseudo Random Number Generation (CPRNG)—is a PRNG with properties that make it suitable for use in cryptography, which includes the use of entropy obtained from a high quality source such as a computer's randomness API.

Predetermined Cryptographic Key Generation—in cryptography, a cryptographic key is computed by applying a predetermined mathematical hash algorithm. The output of the Predetermined Cryptographic Key Generation process is then available for use.

Obscuring—altering network communications from an expected form. This can include encrypting. It can also include altering the manner in which the network communication is transmitted. Multiple methods may be employed to obscure the same network communication. A number of possible methods for obscuring will be described.

Revealing—means to restore an obscured network communication to its expected form.

Communication Channel, Path or Line and a Network Channel, Path, or Line—refer either to a physical transmission medium such as a wire, or to a logical connection over a multiplexed medium such as a radio channel for the purpose of conducting electronic communications between two or more devices in the computer network in either digital or analog formats.

Polymorphic or Polymorphism—in cryptography, it means to mutate, or change, while keeping the original algorithm in tack.

Idempotent—in mathematics and computer science, is the property of certain operations that can be applied multiple times without changing the result beyond the initial application (i.e. there exists an $S_0$ such that $S_0 = S_1 S_2 S_3 \ldots S_n$)

Figure 1:
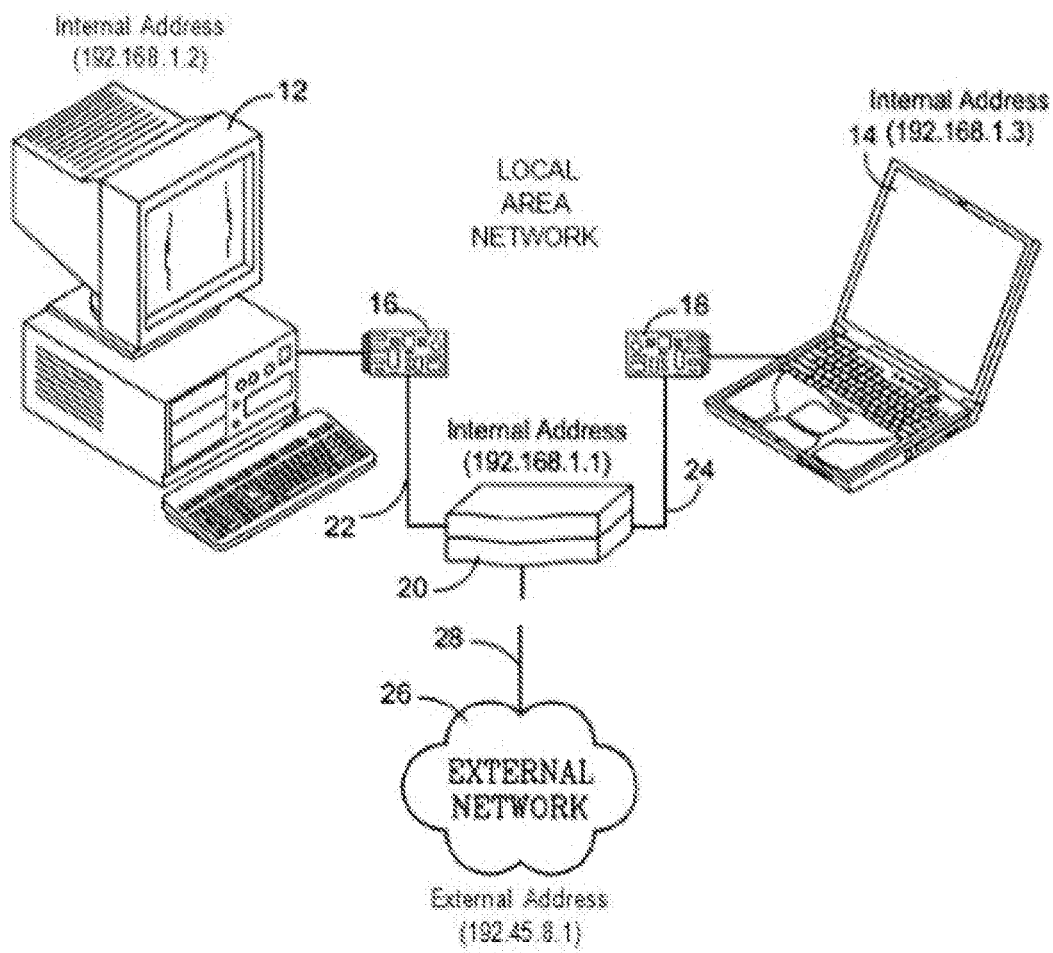
FIG. 1 is a schematic diagram of a network in which various embodiments of the present invention may be implemented.

Environment:

Using FIG. 1, a diagram of an example Digital Communications Local Area Network and External Network (Network) 10, or Network 10, in which the present invention may be implemented and Network 10 includes computers 12 and 14 and each computer 12 and 14 includes a network interface device 16 or 18. In the example of FIG. 1, network interface device 16 is a network interface card 16, while network interface device 18 is a modem. Environment 10 also includes link 20. Communication Paths, or Communications Lines, or wire, 22 and 24 connect network interface devices 16 and 18 to link 20. Link 20 is connected to external network 26 by communication path 28. Computers 12 and 14 can each be referred to as a node or a module or a generator meaning they are an active electronic device attached to network 10, and are capable of creating, receiving, or transmitting information over a communications channel on network 10. Link 20 can also be referred to as a node on network 10.

Computers 12 and 14 represent generally any devices capable of transmitting and receiving electronic data. While shown as desktop and laptop computers, devices 12 and 14 could, for example, be personal digital assistants or cellular telephones. Network interface devices 16 and 18 represent generally any combination of hardware and/or programming capable of transmitting and receiving network communications. Link 20 represents generally any combination of hardware and/or programming capable of receiving network communication from computers 12 and 14 and from external network 26 and routing the communication to its intended destination. Where the communication is between computers 12 and 14, link 20 functions as a hub. Where communication is between computer 12 or 14 and external network 26, link 20 functions as a router. The connections between link 20 and paths 22 and 24 are referred to as internal ports, and the connection between link 20 and path 28 to external network 26 is referred to as an external port.

Communication paths 22, 24, and 28 represent generally any medium for transmitting network communications. A path may be wireless or include one or more physical wires, optical cables or any other media through which data may be transmitted. One path 22, 24, or 28 may use one medium, while another path may use a different medium. For example, path 24 may use a telephone line, path 22 may use cat-5 cable, and path 28 may use radio frequency.

Network Communications and Data Streams:

Using FIG. 1, computers 12 and 14 and link 20 form a local area network. Each has its own internal address while link 20 also has an external address for communicating with external network 26. If, for example, computer 12 wants to send data to computer 14, computer 12 places the data into a packet. For identification and communication purposes computer 12 puts its own address (e.g. 192.168.1.2) into the packet. The packet also includes the destination address (e.g. 192.168.1.3) for computer 14. In a manner not described here, computer 12 can determine that computer 14 is on the same local area network, so it sends the packet over path 22 to link 20. Link 20 then rebroadcasts the packet through each of its internal ports. Computers 12 and 14 each receive the packet and read the packet's destination address. Recognizing that it is not the intended destination, computer 12 ignores the packet. Computer 14, on the other hand, recognizes that it is the intended recipient of the packet and accepts it. It is noted that multiple packets are usually required to transmit data such as a file between computers 12 and 14.

If, for example, computer 12 wants to send data to external network 26, computer 12 places the data into a packet. The packet includes the source address (e.g. 192.168.1.2), and the destination address (e.g. 192.45.8.1). In a manner not described here, computer 12 can determine that the destination address is not on the same local area network, so computer 12 includes an intermediate address in the packet—the internal address for link 20—and sends the packet to link 20. Link 20 then rebroadcasts the packet through its external port to external network 26.

Where link 20 receives a packet addressed to computer 12 from external network 26, link 20 rebroadcasts the packet through each of its internal ports, Computers 12 and 14 each receive the packet and read the packet's destination address. Recognizing that it is not the intended destination, computer 14 ignores the packet. Computer 12, on the other hand, recognizes that it is the intended recipient of the packet and reads it.

In operation, link 20 continually and simultaneously broadcasts the same data stream through each of its internal ports. Computers 12 and 14 continually monitor the data stream ignoring some packets and reading others. The data stream broadcast by link 20 and monitored by computers 12 and 14 is generated as a result of various human interactions with computers 12 and 14 and external network 26. Given a sufficiently large number of human interactions contributing to the data stream, that stream is for all intents and purposes truly random and unpredictable. When broadcast by link 20, the data stream is instantaneously received by computers 12 and 14. Link 20 and computers 12 and 14 can simultaneously sample and process the data stream at each end of communication paths 22 and 24 allowing each to generate identical cryptographic keys.

In the example of FIG. 1, network communications includes all the communications broadcast and received at each end of each communication path 22 and 24. By contrast, the term data stream means data broadcast from a source over one communication path or simultaneously over multiple communication paths. In the example of FIG. 1, the term data stream includes the stream of data broadcast by link 20 through each of its internal ports over communication paths 22 and 24. A data stream is then an example of a network communication. Because network communications can come from multiple sources, not all network communications are data streams.

Operation:

The OTP Matrix would typically be implemented as an independent function within a computer based, encryption solution. The ciphers are randomly selected, FIPS certified 140-2 ciphers (chosen from a pool of user supplied ciphers) and the keys are produced from various methods for generating a key. Ciphers and generated keys are randomly paired and stored in a volatile matrix for use by an encryption solution.

Figure 1A:
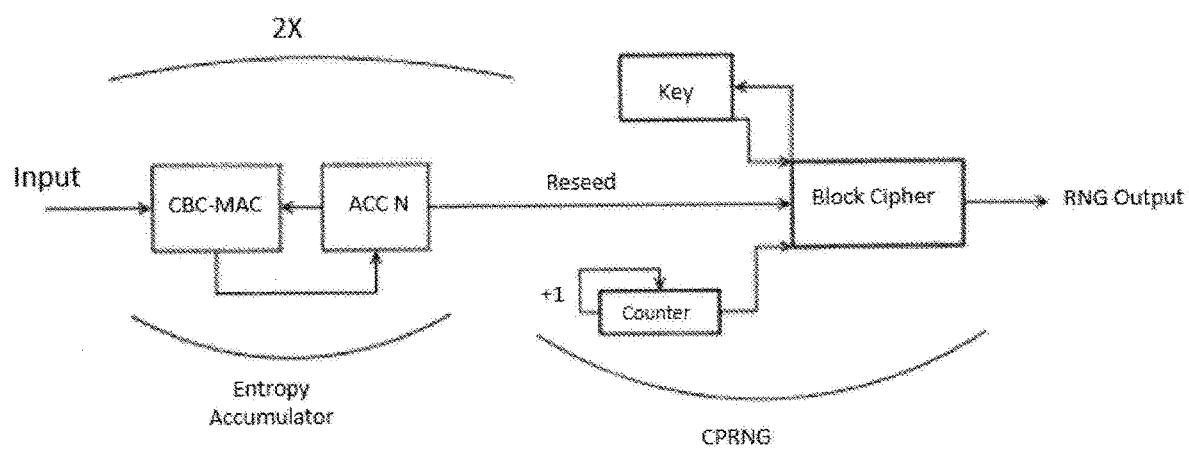
FIG. 1A is an exemplary block diagram of a Cryptographic Pseudo Random Number Generator/Pseudo Random Number Generator (CPRNG/PRNG) method for generating cryptographic keys according to an embodiment of the present invention.
Figure 1B:
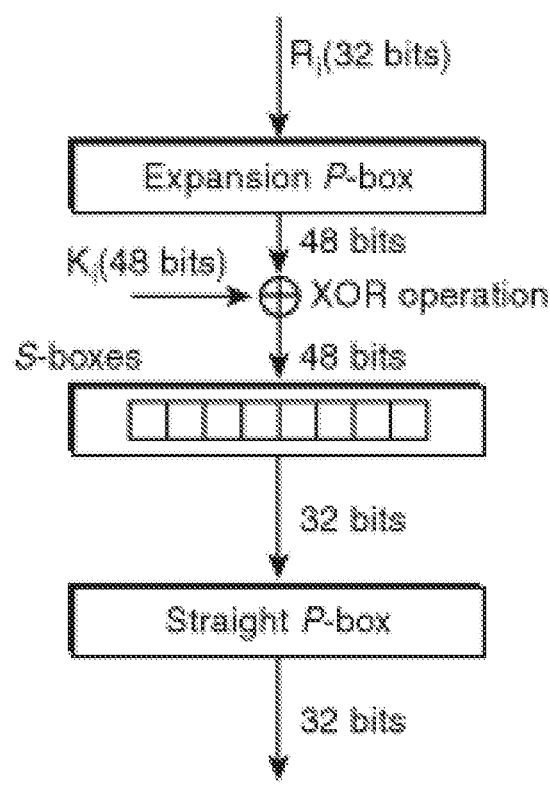
FIG. 1B is a exemplary block diagram of a Predetermined Cryptographic Key Generator (PCKG) method for generating cryptographic keys according to an embodiment of the present invention.

Generating Keys:

The OTP Matrix can use a variety of sources for key generation including Network Data (as illustrated herein), Cryptograpic Pseudo Random Number Generators/Pseudo Random Number Generators and Predetermined Cryptographic Key Generators. Since other key generating sources are useful, FIG. 1A illustrates what a typical CPRNG/PRNG would look like with this particular example being for a wireless network as described by Aurelien Francillon and Claude Castelluccia in their article "TinyRNG: A Cryptographic Random Number Generator for Wireless Sensors Network Nodes", herein included by reference and FIG. 1B is a diagram of what a generic Predetermined Cryptographic Key Generator would look like in which each step in the process is driven by a predetermined rule to map inputs to outputs.

Figure 2A:
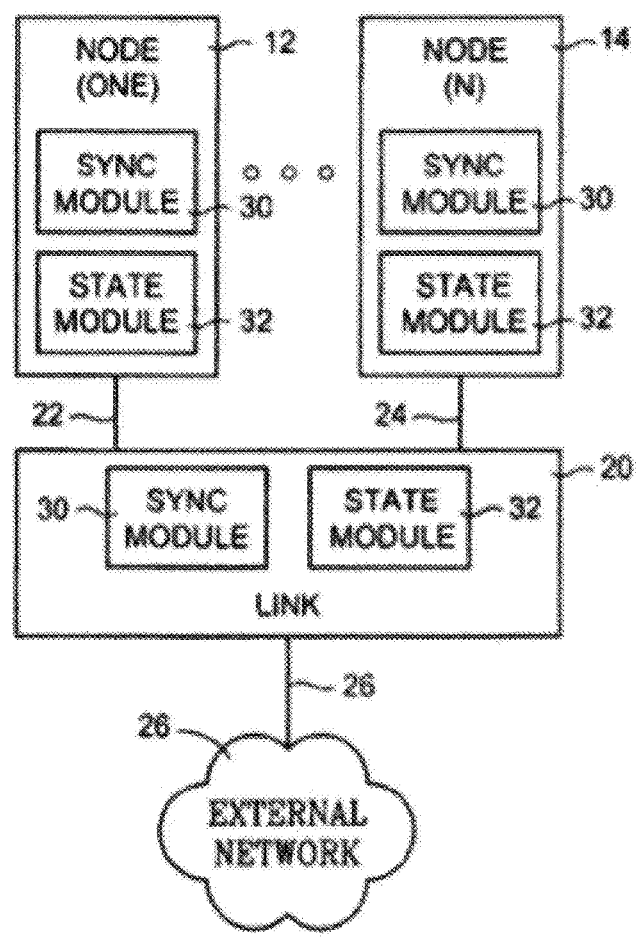
FIG. 2A is a block diagram of the network of FIG. 1 illustrating exemplary components for implementing an embodiment of the present invention.

For purposes of illustration and example, when generating a key using a network data stream, as disclosed in Whilhite, US Patent Application US 2005/0074118 A1 which IS incorporated by reference, FIG. 2A is a block diagram of the network of FIG. 1. Computers 12 and 14 from FIG. 1 are shown as node (ONE) 12 and node (N) 14 and are joined by link 20. While only nodes 12 and 14 are shown, any number of additional nodes may be present. Link 20 continuously broadcasts the same network data stream to nodes 12 and 14. The network data stream broadcast by link 20 is assembled from communications received from each node 12 and 14 and from external network 26. Each node 12 and 14 has a unique address, and while a given node 12 or 14 listens to or reads the data stream, it ignores portions from the data stream that are not intended for that node.

Embodiments of the present invention can be implemented in sync module 30 and state module 32 present at each node 12 and 14 as well as link 20. Referring back to FIG. 1, sync modules and state modules may be included within the design of link 20 and network interface devices 16 and 18. Sync module 30 represents any combination of hardware and/or programming capable of sampling and processing a network data stream to produce state data. State data is data that identifies the method or methods to be used to obscure and reveal network communications. State module 32 represents any combination of hardware and programming capable of using state data received from sync module 30 to obscure and reveal network communications.

Figure 2B:
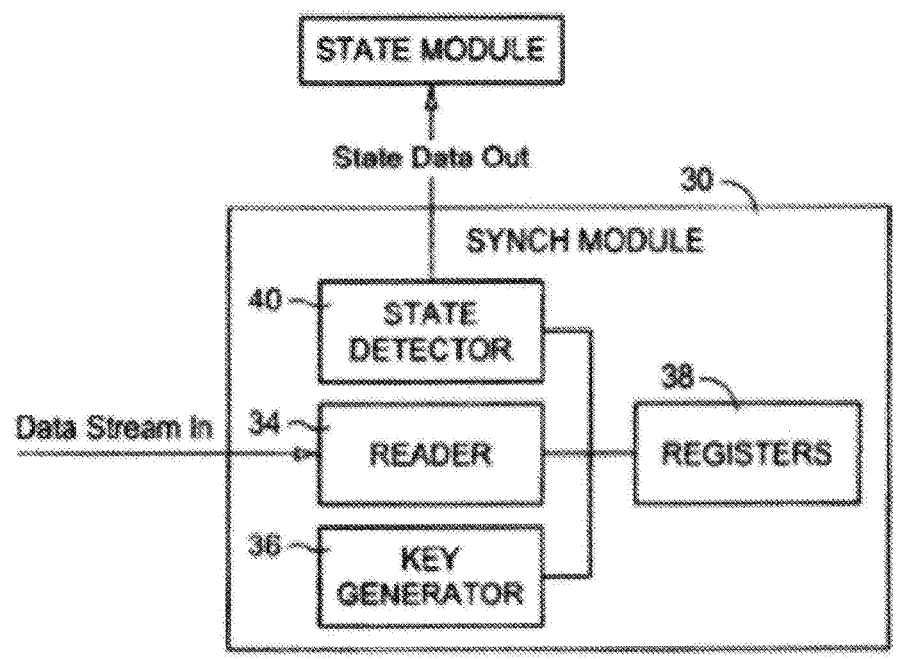
FIG. 2B is a block diagram illustrating the components of an exemplary sync module according to an embodiment of the present invention.

Referring now to FIG. 2B, sync module 30 includes reader 34, key generator 36, registers 38, and state detector 40. Reader 34 represents any combination of programming and/or hardware capable of reading a network data stream. Key generator 36 represents any combination of programming and/or hardware capable of processing data received from the reader in order to generate a cryptographic key. Registers 38 represent memory used to store cryptographic keys. State detector 40 represents generally any combination of programming and/or hardware capable of using a cryptographic key to generate state data.

Figure 3:
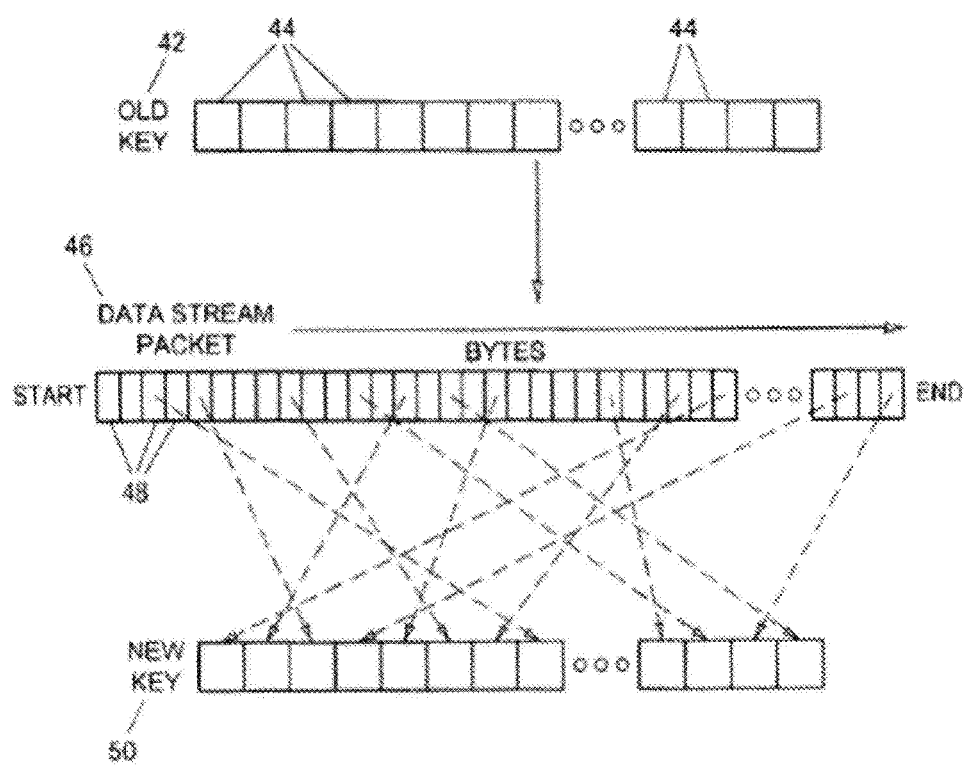
FIG. 3 illustrates an exemplary method for generating cryptographic keys according to an embodiment of the present invention.

FIG. 3 helps to illustrate how sync module 30 uses a network data stream to generate cryptographic keys. Starting with FIG. 3 and with reference to FIG. 2B, an existing cryptographic key, referred to as old key 42, is stored in register 38. Old key 42 is made up of a given number of bytes 44. Reader 34 reads a network data stream. In this example, the network data stream is packet 46 which is made up of a number of bytes 48. When processing packet 46, key generator 36 uses old key 42 to generate new key 50. New key 50 is assembled from bytes 48 taken from packet 46. The particular bytes 48 used and the order in which those bytes 48 are assembled to form new key 50 are determined by old key 42. For example, key generator 36 may use an algorithm that operates on the value of old key 42 to specify the particular bytes 48 of packet 46 and the order of those bytes 48 when assembling new key 50.

Referring back to FIG. 2A, sync modules 30 are present at each node 12 and 14 as well as link 20. Because all sync modules 30 are reading the same data stream at the same time, sync modules 30 can simultaneously generate the same new key 50. Once new key 50 is generated, state modules 32 use new key 50 to obscure and reveal network communications. For example, node 12 may broadcast a packet intended for node 14. State module 32 on node 12 uses new key 50 to obscure the packet. Link 20 receives the obscured packet. State module 32 on link 20 reveals the obscured packet using new key 50, obscures the packet again using new key 50, and then broadcasts the obscured packet to both nodes 12 and 14. Each node 12 and 14 receives the packet. State modules 32 at each node 12 and 14 reveal the packet. Node 14 accepts the packet. Node 12 ignores the packet as it is addressed to node 14.

An intruder desiring to calculate a new key must have access to an existing key, the network data stream, and the algorithms used to calculate the new key. To further decrease the likelihood of an intruder's success, new keys are periodically generated.

Figure 4:
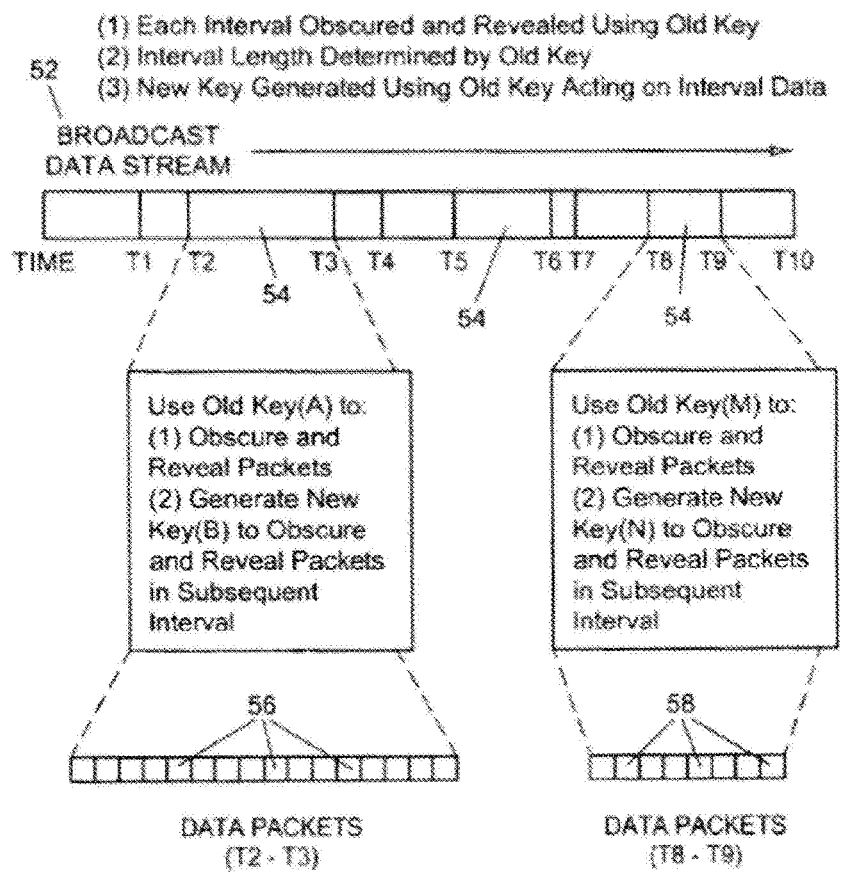
FIG. 4 further illustrates the exemplary method for generating crytographic keys according to an embodiment of the present invention.
Figure 5:
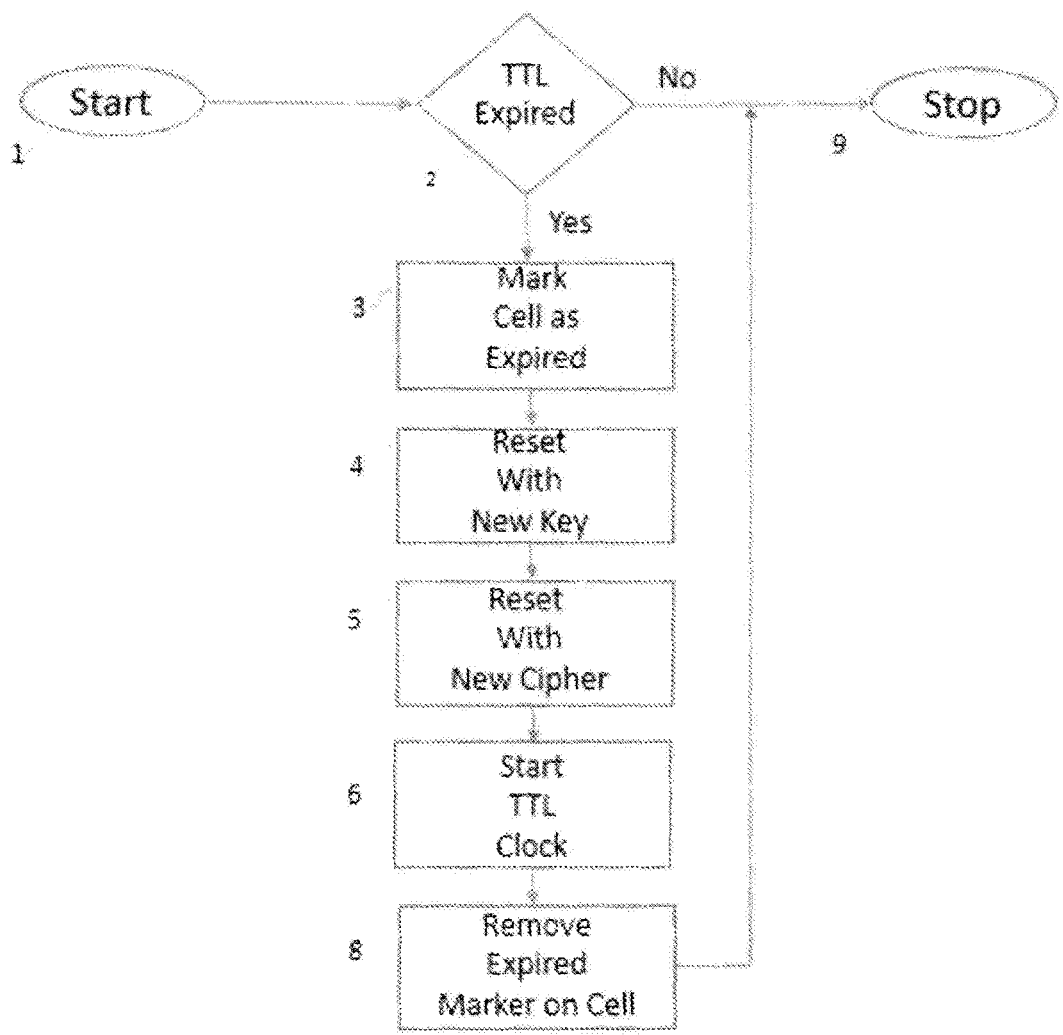
FIG. 5 is the One Time Pad Matrix generation process.

FIG. 4 helps to illustrate how sync modules 30 periodically generate new keys. A multi-packet data stream is referenced as 52. Data stream 52 is broken into a number of variably sized intervals 54. Each interval 54 includes a number of packets. The length of an interval 54, then, is determined by the number of packets it contains. For example, interval 54 between T2 and T3 includes sixteen packets 56. Interval 54 between T8 and T9 includes eight packets 58. An interval 54 may be of any length. During a specified interval 54, an existing or old key 42 (shown in FIG. 3) is used to obscure and reveal network communications. The length of the interval for which old key 42 is valid can be calculated using old key 42 or any previous key. That is, old key 42 or another previous key can be used to determine the number of packets in an interval 54. During a subsequent interval 54, new key 50 is used to obscure and reveal network communications. Again, the length of the subsequent interval 54 can be calculated by new key 50, old key 42, or a previous key. Key generator 36, for example may be responsible for determining an interval for a given key.

As an example, a new key 50 used to obscure and reveal network communications for the interval 54 between T3 and T4 may be assembled from bytes taken from one or more packets 56 broadcast during the previous interval 54 between T2 and T3. The particular packet 56 used may be determined by old key 42—the key used to obscure and reveal network communications between T2 and T3. Alternately, the particular packet used may be fixed. For example it may always be the first or last packet of an interval 54.

It is extremely unlikely if not impossible for an intruder to successfully calculate a key. Because the keys are not transferred, they cannot be intercepted. Even if a key were calculated or guessed, that key is only valid for a short period of time. Possession of a single key provides insufficient knowledge to reveal data obscured through use of that key; knowledge of each obscuring method employing that key and, possibly, previous keys, must also be obtained before the key may be used to compromise data. Further, possession of a single key does not provide the means for predicting any future or prior key. Therefore, network communications obscured using keys generated in the manner described above are extremely secure when compared to currently exiting levels of security.

The OTP Matrix can further reduce latency and overhead through the use of other reliable methods of key generation such as Cryptograpic Pseudo Random Number Generators/ Pseudo Random Number Generators and Predetermined Cryptographic Key Generators, which quickly produces keys.

Cryptographic Ciphers:

The OTP Matrix uses not only FIPS 140-2 certified ciphers, but, can use any recognized, certified cipher. The National Institute of Standards and Technology (NIST) issued the FIPS 140 Publication Series (FIPS 140-1 or FIPS 140-2) to coordinate the requirements and standards for cryptography modules that include both hardware and software components. This standard specifies the security requirements that will be satisfied by a cryptographic module. The standard provides four increasing, qualitative levels of security intended to cover a wide range of potential applications and environments. The security requirements cover areas related to the secure design and implementation of a cryptographic module. These areas include cryptographic module specification; cryptographic module ports and interfaces; roles, services, and authentication; finite state model; physical security; operational environment; cryptographic key management; electromagnetic interference/ electromagnetic compatibility (EMI/EMC); self-tests; design assurance; and mitigation of other attacks. The cryptographic modules are produced by the private sector or open source communities for use by the U.S. government and other regulated industries (such as financial and healthcare institutions) that collect, store, transfer, share and disseminate sensitive but unclassified (SBU) information.

Figure 6:
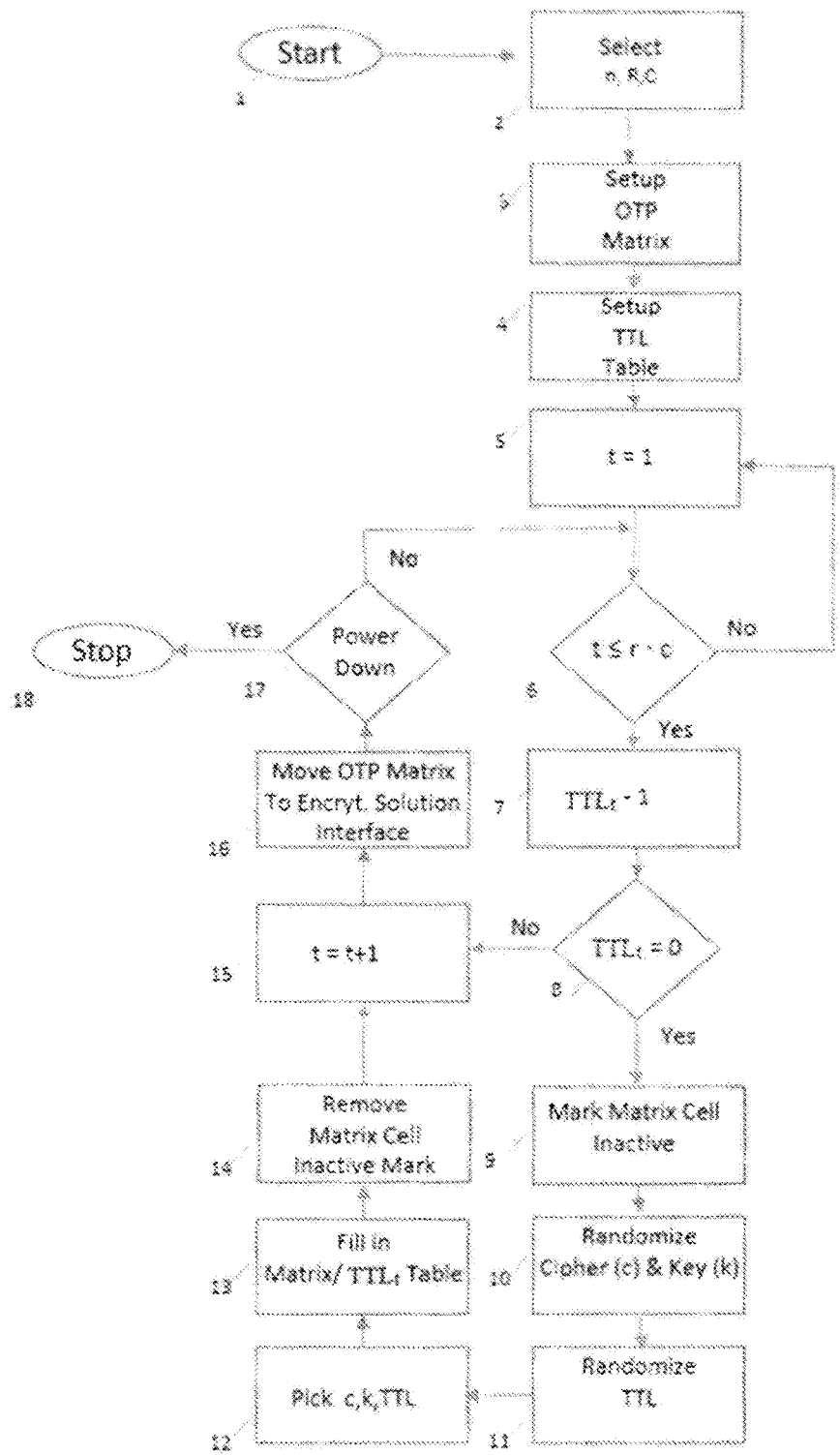
FIG. 6 is a diagram of the population of the OTP Matrix and TTL table and interface to an encryption solution.
Figure 7:
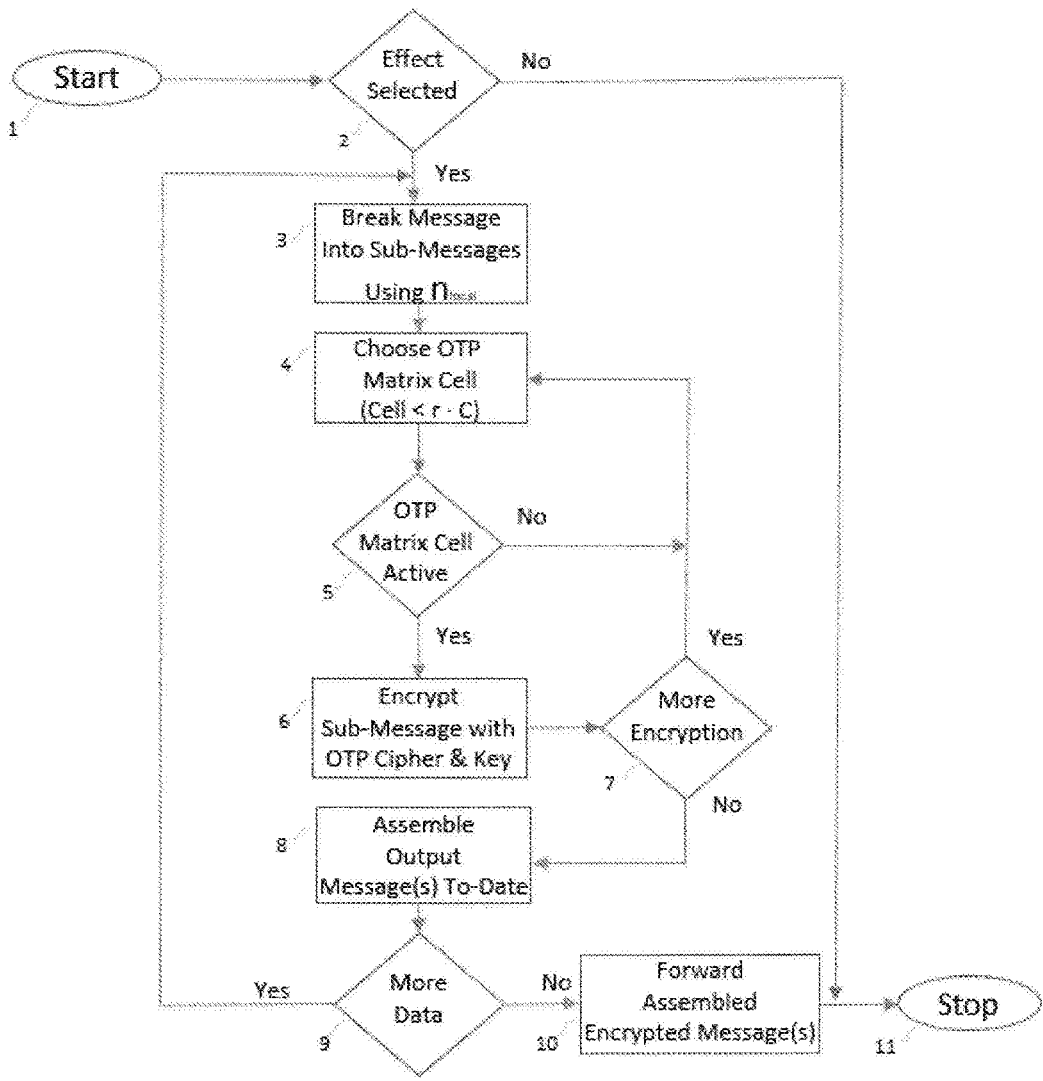
FIG. 7 is an exemplary flow diagram illustrating exemplary components for implementing an embodiment of the present invention.

Obscuring and Revealing:

By way of example, FIG. 6 is the process the present invention uses to setup and repopulate the OTP Matrix that will be used by an encryption solution, such as the CipherLoc PKPA Cipher Engine. FIG. 7 is a high-level flow diagram that illustrates the process that an encryption solution, such as the CipherLoc PKPA Cipher Engine, uses in conjunction with the present invention.

Note: The OTP Matrix and the TTL Table have a 1:1 correspondence. The OTP Matrix is mutually exclusive of any encryption solution that may use it and the timing for repopulation of the OTP Matrix cells and timer reset of the TTL Table cells is independent of any timing constraints/ requirements of the encryption solution using the OTP Matrix and/or the TTL Table.

In FIG. 6, Step 1, the OTP Matrix begins its' process of making ciphers and keys available to encryption solutions. It is constantly in a mode of maintaining the cells and tables and elements therein and is initiated at startup time on the host computer on which it is running. Beginning with Step 2, the size of the OTP Matrix and TTL table is determined, followed in Step 3 with the setup of the OTP Matrix to match the size determination in Step 2 and in Step 4, the corresponding TTL table is setup to match the size of the OTP Matrix. Step 5 initializes the Cell Pointer (t) to a baseline of "1" and Step 6 checks the Cell Pointer to make sure that it is still within the boundaries of the OTP Matrix and TTL Table cells. If the Cell Pointer value is equal to or less than the number of cells in the OTP Matrix and TTL Table it will proceed to Step 7, otherwise, control is passed back to Step 5. In Step 7, the TTL Table cell's TTL value is decremented by "1" and in Step 8, the cell's TTL value is checked to make sure it has not reached a value of "0". If it is not "0", control is given to Step 15. If the cell has reached a value of "0", control is passed to Step 9 where the OTP Matrix cell is marked "inactive". In Step 10, randomization routines are used to select ciphers from an available pool of user supplied ciphers and he keys are produced from various methods for generating a key that includes reading a data stream from a network or a Cryptographic Pseudo Random Number Generator (CPRNG)/Pseudo Random Number Generator (PRNG) or a Predetermined Cryptographic Key Generator (PCKG) or any combination of all. In Step 11, new TTL values are randomly calculated. In Step 12, ciphers and keys are randomly selected for the OTP Matrix cell and a new TTL value is randomly selected for the corresponding TTL Table cell. In Step 13, the OTP Matrix cell is populated with the selected cipher and key values and the corresponding TTL Table cell is populated with the selected new TTL value. In Step 14, the OTP Matrix cell's "inactive" marker is removed. In Step 15, the Cell Pointer is incremented by "1" and control passes to Step 16. Step 16 involves interfacing with the encryption solution by copying the OTP Matrix cell to a memory location that is accessible by the encryption solution interface, thus, providing the encryption solution with access to the most current copy of the OTP Matrix, regardless of whether or not a particular cell in the OTP Matrix might be marked "Inactive". Step 17 checks to see if the computer is going through a power-down process and if it is, the present invention stops working, otherwise, it assumes the computer will remain running and control is passed back to Step 6, at which point, the continuous routine of Steps 6-17 is repeated until the computer on which it is running is turned off.

To illustrate an actual use case scenario, FIG. 7, shows how the CipherLoc PKPA Cipher Engine would be invoked by a main application program and in step 2 the CipherLoc PKPA Cipher Engine makes a decision as to whether or not an "effect" is needed. If none is required, no further encryption steps are performed. If, however, an effect is required, the CipherLoc PKPA Cipher Engine will begin breaking the message into different size blocks of data, step 3.

Note: The encryption solution always has full access to the most current copy of the OTP Matrix (FIG. 6, step 16).

In Step 4 the CipherLoc PKPA Cipher Engine will randomly choose an OTP Matrix cell and obtains the key and associated cipher. In Step 5 the encryption solution will check to make sure the selected cell/cipher/key are "active" and if marked "inactive", will repeat steps 4-5 until no "inactive marker is found.

In step 6, the CipherLoc PKPA Cipher Engine has the key and encryption method from the OTP Matrix, and it encrypts the sub-message.

Note: Using strong ciphers has the effect of making any portion of the message cryptographically strong. It has been shown by Maurer and Massey in their article "Cascade Ciphers: The Importance of Being First," first published in the Journal of Cryptology, 1993, that in a product cipher the security of the overall system is AT LEAST as strong as the weakest cipher used in the process. Further, using key space as a measure and strength, then the key space is expanded to:

$$m_{avg} = \prod_{s=1}^{t} \left( n! \prod_{i=1}^{n} \left( \sum_{j=1}^{r_i} (P(c_j)|K_j|) \right)_i \right)_s$$

where: M=Total number of keys
P=Probability of (function)
s=Slots
t=Time
n=Number of possible ciphers
n!=Ordering of Ciphers
r=Probability of choosing a specific cipher
K=Key space of cipher
c=Cipher
i=Base
j=Base This results in a net average key space of $2.5 \times 10^{1500}/4$ ms (at current CPU speeds), thus, it is more secure than a single encryption.

After encryption is complete, a determination is made in step 7 as to whether or not additional encryption is required. If more encryption is required, steps 4-7 are repeated.

Once all encryption is complete, the CipherLoc PKPA Cipher Engine assembles all encrypted sub-messages to-date, step 8, and checks to see if more data requires encryption. It more data requires encryption, it repeats steps 3-8.

Figure 7A:
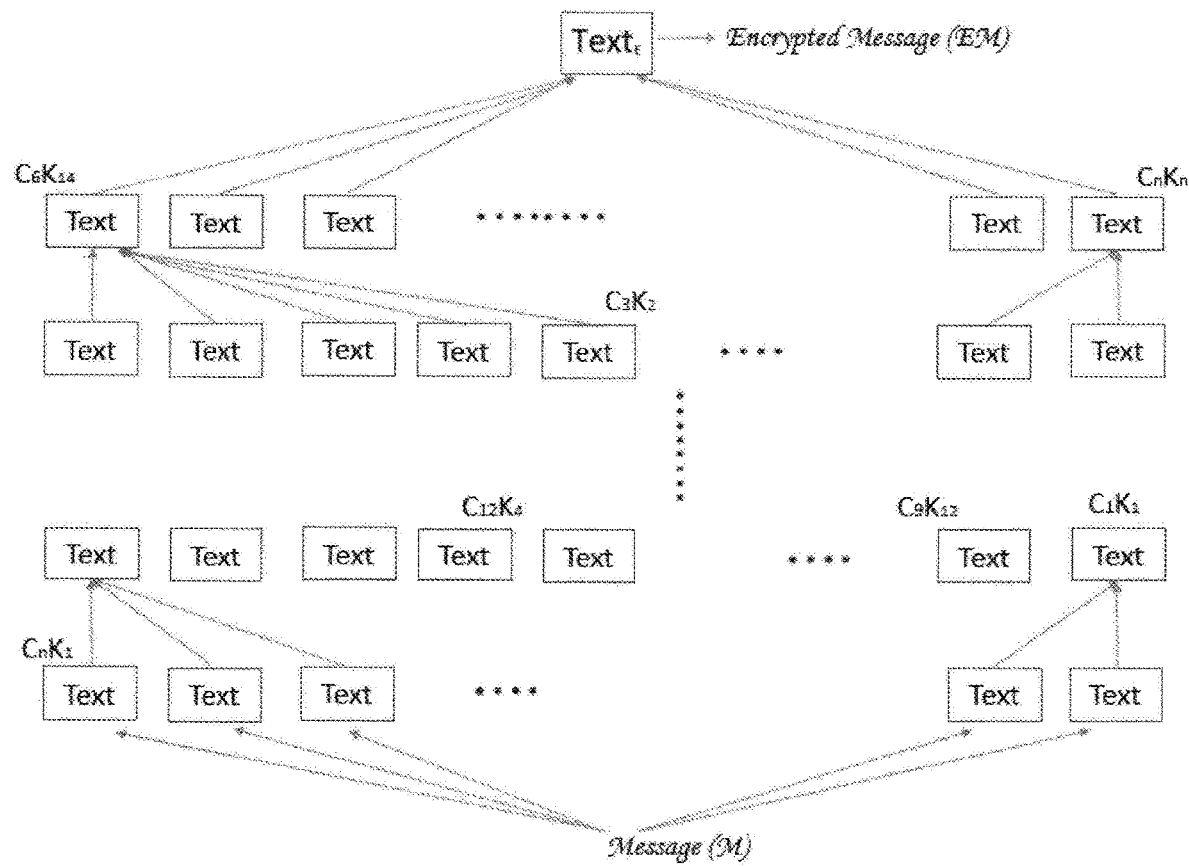
FIG. 7A is a simple matrix-like diagram that illustrates the logical organization of the cipher and key combinations that are the result of implementing an embodiment of the present invention.

After all data has been encrypted, the CipherLoc PKPA Cipher Engine forward the encrypted message(s), as illustrated in FIG. 7A, to the application that initially invoked it.

CONCLUSION

The above description involves obscuring network communications between computers. The same techniques can be used to obscure any digital communication. For example, the techniques described may for example be employed to obscure digital voice communications or digital audio/video signals. All that is required is a data stream that can be sampled and processed at each end of a communication path, sync modules at each end that use the data stream to calculate keys or a Diffie-Helmann secure key exchange of a key generated at the transmitting source, and state modules at each end that use the keys to obscure and reveal network communications.

FIG. 1 illustrates an exemplary environment in which various embodiments of the present invention may be implemented. The environment shown is merely an example. Embodiments of the present invention can be implemented in any environment in which electronic devices exchange information. The block diagrams of FIGS. 2A, 2B and 7 show the architecture, functionality, and operation of an exemplary embodiments of the present invention. Each block may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable medium for use by or in connection with an instruction execution system such as a computer/processor based system or an ASIC (Application Specific Integrated Circuit) or FPGA (Field Programmable Gate Array) or other system that can fetch or obtain the logic from computer-readable media and execute the instructions contained therein. "Computer-readable medium" can be any of one or more computer readable media that can contain, store, or maintain process specifications and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow chart of FIG. 6 shows a specific order of execution, the order of execution may differ from those depicted. For example, the order of execution of two or more blocks may be scrambled relative to the order shown. Also, two or more blocks shown in succession may be executed concurrently or with partial concurrence. All such variations are within the scope of the present invention.

Embodiments of the present invention have been shown and described with reference to the foregoing exemplary implementations. It is to be understood, however, that other forms, details, and embodiments may be made without departing from the spirit and scope of the invention which is defined in the following claims.

The invention claimed is:

1. A method of encryption simulating a one time pad comprising the steps of:
   a. independently applying and changing encryption algorithms by reconfigurable matrix blocks;
   b. selecting pre-synchronized and configured encryption blocks for either a single character or block composite symbol; and
   c. multiplexing the encryption stream from the matrix of configured encryption blocks to select the encryption output and combining the output by temporal concatenation;
   d. wherein each of said matrix blocks in the matrix is independent of the other and each block has an independent Time To Live (TTL) which is maintained in a table corresponding to each block in the matrix such that when the TTL expires;
   (I) a cell in the block is marked as expired;
   (ii) the cell is reset with a new, randomly selected cipher @, key (k) and TTL;
   (iii) start TTL clock where one is subtracted from the TTL of each cipher in the table for every transmitted block; and
   (iv) the "expired" marker is removed from the cell.

2. The method according to claim 1 wherein said reconfigurable matrix blocks comprise at least one field programmable gate array chip.

3. The method according to claim 1 wherein each symbol, or block, uses a random row/column to select what block the encryption process will use.

4. The method according to claim 3 wherein if a block is being replaced or is marked as expired when selection occurs, the block is marked and if marked, the next block is selected as with a hash collision.

5. The method according to claim 4 wherein said reconfigurable matrix blocks are created using memory architecture.

* * * * *